United States Patent Office 3,334,023
Patented Aug. 1, 1967

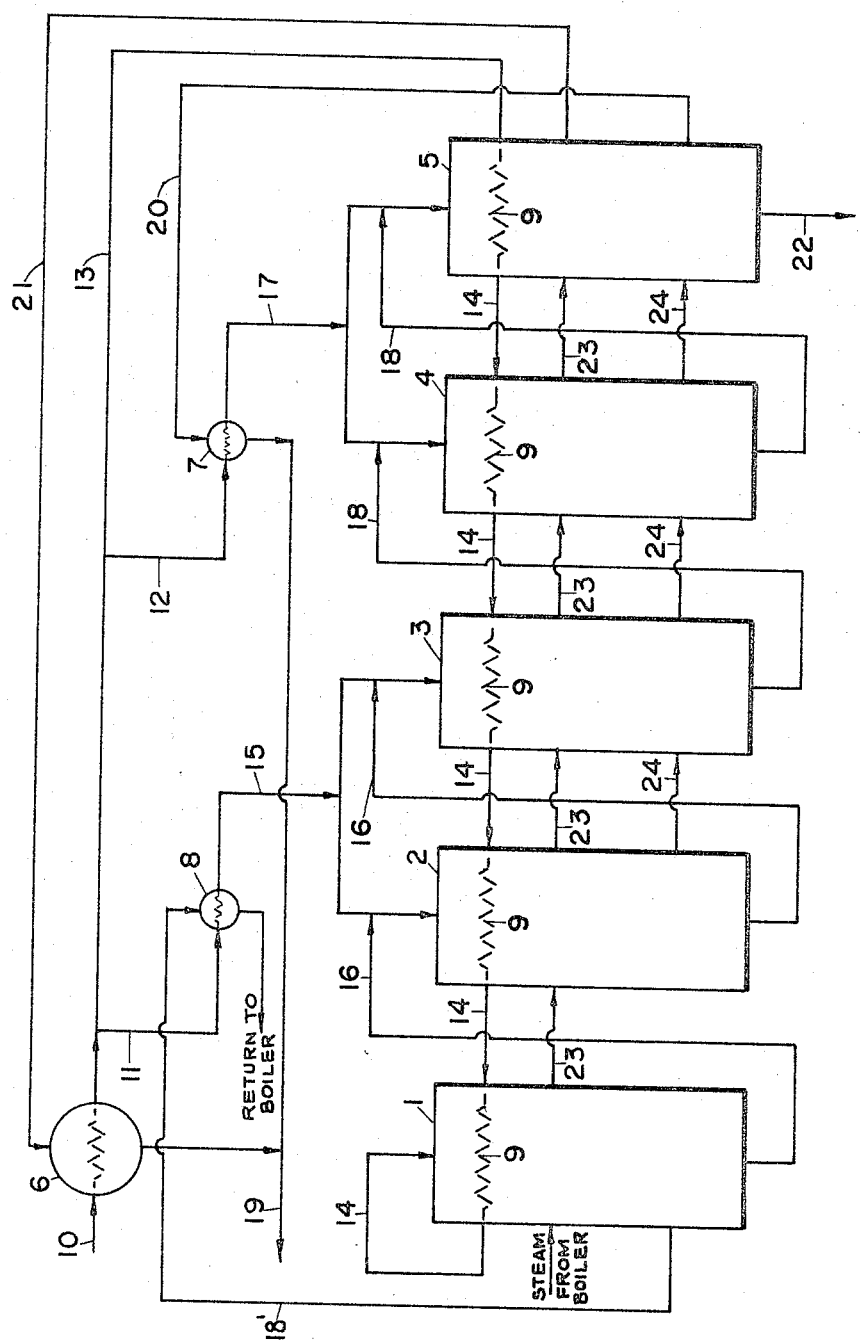

3,334,023
MULTI-STAGE EVAPORATING APPARATUS
Robert J. Fritz, Burlington, Vt., assignor to General
Electric Company, a corporation of New York
Filed Dec. 21, 1965, Ser. No. 515,384
3 Claims. (Cl. 202—172)

The present invention relates to a multi-stage evaporating apparatus having a unique heat-exchange and feed distribution system. More specifically, the present invention relates to a multi-stage evaporator, in which portions of the feed liquid are heated in the apparatus to different temperature levels and then fed to the various evaporating stages of the apparatus, partially in series and partially in parallel.

In a multi-stage evaporator, the initial quantity of liquid feed to the apparatus must be extremely high in order to prevent an excessive solute concentration in the lower pressure stages of the apparatus. High solute concentration or brine concentration, in the case of a sea water evaporator, is undesirable because the boiling temperature of a liquid generally increases as the concentration of solute increases. Also fouling or scaling of the evaporating surfaces is more likely to occur in the low temperature stages due to the high solute concentration. Both of these conditions result in lower heat transfer efficiency. The large quantity of liquid feed which must therefore be supplied to a multi-stage evaporator having conventional series feed, necessarily results in increased equipment cost. In this type of evaporator, unevaporated liquid from one stage becomes the feed liquid for the subsequent stage and the entire quantity of feed liquid to the apparatus must therefore be heated to a temperature near the first stage evaporating temperature. A substantial amount of heat exchange area is thus required. Furthermore, first stage economy is impaired by the large volume of liquid throughout since part of the evaporating surface in the first stage must be used to heat the large quantity of feed to its evaporating temperature.

It is an object of the present invention to provide a multi-stage evaporating apparatus in which the feed rate to the first stage is less than would otherwise be required for a conventional multi-stage evaporating apparatus having the same capacity.

Another object of this invention is to reduce the amount of heat exchange area required in a multi-stage evaporator.

It is a further object of this invention to provide an efficient heat exchange and feed distribution system in a multi-stage evaporating apparatus.

Briefly, these objects are met by a multi-stage evaporating apparatus in which the total liquid feed, after being heated in a condenser for the vapor products of the apparatus, is divided and heated to different temperature levels and then fed separately into different portions of the multi-stage evaporating apparatus. More specifically, one portion of liquid feed is heated by contact with the vapors produced in the various stages of the apparatus so that it is heated to near the operating temperature of the first or highest pressure stage of the apparatus. This portion is then fed to the first or highest pressure stage of the apparatus. The unevaporated liquid from the first stage and each of the succeeding stages, except the last, is fed in a conventional manner sequentially through the successively lower pressure evaporating stages. Another portion of liquid feed is heated as it is passed through a heat exchanger in which condensate formed in the first or highest pressure evaporating stage is cooled. This portion of the liquid feed is combined with the unevaporated liquid being fed to one or several of the intermediate pressure stages of the apparatus. Finally, still another portion of liquid feed is heated to a temperature, below that to which the second portion is heated, by a heat exchanger in which the condensate from the lower pressure stages of the apparatus is cooled. This third portion is then combined with the unevaporated liquid being fed to one or several of the lower pressure stages of the apparatus.

In one embodiment of the present invention, the efficiency of the multi-stage evaporating apparatus is further improved by flash-evaporating and condensing in a subsequent or lower pressure stage, the condensate from stages other than the first stage thereby transferring heat from the condensate produced in any given stage to a subsequent stage.

The subject matter of the present invention is particularly pointed out and distinctly claimed in the concluding portion of this specification. The invention, however, together with further objects and advantages thereof, may be better understood by reference to the following description, taken in conjunction with the accompanying drawing showing a multi-stage flash distillation apparatus in which like numbers refer to like parts.

Referring specifically to the drawing which is a schematic illustration of one form of the present invention, there is shown a five-stage evaporating apparatus. It will be obvious to those skilled in the art that a five-stage apparatus is selected only for purposes of illustration, and the teachings of the present invention are equally applicable to multi-stage evaporating apparatus comprising more or fewer stages. The illustrated form of the present invention comprises a first or highest pressure evaporating stage 1, second and third or intermediate pressure evaporating stages 2 and 3, and fourth and fifth or lower pressure evaporating stages 4 and 5. There are also shown a vapor product condenser 6, a low pressure condensate cooler 7 and a high pressure condensate cooler 8. Additional heat exchangers 9 are located so that they are in contact with vapor produced in the various stages of the apparatus. For example, heat exchangers 9 may be located as illustrated within the vapor space of the various pressure evaporating stages of the apparatus.

The liquid distribution system of the invention comprises a number of liquid delivery means, a term hereinafter used to include the necessary piping, pumps, fittings, valves, etc. to accomplish the specific liquid delivery described. Thus, a flow line such as the flow line 10 is intended as a representation of such a liquid delivery means. More specifically, this liquid distribution system comprises a means 10 for delivering the total liquid feed to the apparatus via the vapor product condenser 6, a means 11 for delivering a first portion of the liquid feed from the vapor product condenser 6 to high pressure condensate cooler 8, a means 12 for delivering a second portion of the liquid feed from the vapor product condenser 6 to low pressure condensate cooler 7, and another means 13 for delivering a third portion of the liquid feed from the vapor product condenser 6 to heat exchangers 9 located within the vapor spaces of the various pressure evaporating stages. The liquid distribution system further includes liquid delivery means 14 by which the third portion of liquid feed is passed successively through heat exchangers 9 of the lower, intermediate, and highest pressure evaporating stages and is then fed to highest pressure evaporating stage 1.

Another liquid delivery means 15 passes the first portion of the liquid feed from high pressure condensate cooler 8 to these portions of apparatus where it is combined with unevaporated liquid 16 passing into intermediate pressure evaporating stages 2 and 3. Liquid delivery means 17 passes the second portion of the liquid feed from low pressure condensate cooler 7 to those portions of the apparatus where it is combined with the unevaporated liquid 18 entering lower pressure stages 4 and 5.

Condensate from the first or highest pressure evaporating stage 1 is passed by liquid delivery means 18 from the first evaporating stage 1 to high pressure condensate cooler 8 where it is cooled. From cooler 8, the condensate is then passed to a boiler or heat source (not shown) for evaporation. Steam is supplied from the boiler or heat source to evaporating stage 1. Condensate produced in stages 4 and 5 are passed by liquid delivery means 20 from one or more of the lower pressure evaporating stages to low pressure condensate cooler 7. From cooler 7, the condensate is mixed with the other evaporated products of the apparatus into product stream 19. Finally, vapor products from lowest pressure evaporating stage 5 is passed by delivery means 21 to vapor product condenser 6. From condenser 6, it is combined with the other evaporated products of the apparatus into products stream 19. Unevaporated liquid from the lowest pressure evaporating stage 5 is rejected through liquid delivery means 22. Means 23 for transferring vapor products from all stages except the last to a subsequent, lower pressure evaporating stage is also provided. Means 24 for transferring condensate from all stages except the first and last to a subsequent, lower pressure stage is included in the preferred embodiment of the present invention.

The operation of the apparatus illustrated in the drawing together with some of the advantages thereof will now be described in detail. The liquid feed to the apparatus is first heated by condensing the vapor products of the lowest or last evaporating stage in condenser 6. Thereafter, the liquid feed is divided and that portion which constitutes the feed for the first or highest pressure stage of the apparatus is heated by contacting it with the vapors produced in the various evaporating stages before being fed by liquid delivery means 14 to first evaporating stage 1. It is to be noted that since less than all of the liquid feed to the apparatus is fed to the first evaporating stage, substantial reductions may be made in the capacity of the first stage and, more importantly, in the amount of heat exchanger area used to heat the first stage feed to near the operating temperature of the first stage. Since the operating temperatures of the respective evaporating stages decreases with decreasing pressure, it is significant that only a portion of the liquid feed need be raised to near the operating temperature of the first stage.

As in conventional multi-stage evaporators, unevaporated liquid from all stages except the last is fed sequentially through the successively lower pressure stages of the apparatus and heat is transferred from each stage of the apparatus to a subsequent, lower pressure stage by delivery means 23 which transfers vapor products of all stages, except the last, to the next succeeding stage.

The remaining portions of the liquid feed are heated to intermediate and lower temperature levels by heat exchange with high pressure condensate, from the first stage, in high pressure condensate cooler 8, and low pressure condensate produced in the last or lower pressure stages, in the low pressure condensate cooler 7. These latter two portions of the liquid feed are then fed in parallel to the intermediate and lower pressure stages by combining these portions through liquid delivery means 15 and 17 with the unevaporated liquids 16 and 18 being fed to the intermediate and lower pressure stages.

As discussed previously, since the operating temperatures of the succeedingly lower pressure stages are also correspondingly lower, the temperature of the unevaporated liquid 16 will be at an intermediate level and that of the unevaporated liquid 18 will be at a lower level. Generally, however, the intermediate temperature of the unevaporated liquid 16 will be somewhat higher than that of the portion of the liquid feed delivered by liquid delivery means 15 from high pressure condensate cooler 8 and further heat will be imparted to this portion of the liquid feed by combination with the unevaporated liquid 16. Unevaporated liquids 16 and 18 have a higher concentration of solute than that of the feed liquid due to the loss of liquid in the preceding evaporation stages. The addition of a portion of the liquid feed to the unevaporated liquid 16 and similarly the addition of another portion of the liquid feed to the unevaporated liquid 18, increases the volume of liquid input to the intermediate and lower pressure stages of the apparatus, respectively, and decreases the solute concentration in these liquid inputs. This has two notable effects. First, the evaporation of these liquids is enhanced by the lowered evaporation temperature resulting from dilution of most solutions and, secondly, the tendency which a more concentrated solution would have to deposit scale is avoided, thereby reducing maintenance and preventing deterioration of heat exchange efficiency.

In accordance with the illustrated embodiment of the present invention, the thermal efficiency of this apparatus is further improved by transferring condensate from evaporating stages, other than the first, through liquid delivery means 24 from the evaporating stage in which it is produced to a subsequent lower pressure evaporating stage wherein it is flash evaporated and, thereafter, condensed to impart heat to the liquid being evaporated in that particular stage.

In summary, the multi-stage evaporating apparatus of the present invention is characterized by improved efficiency with respect both to heat utilization and to the proportion of liquid feed which is evaporated. More particularly, however, additional advantages accruing to the present invention include a reduction in the amount of heat exchange area required and a reduction in solute concentration in the latter stages of the apparatus. The beneficial effects of decreased solute concentration have been pointed out hereinbefore.

The multi-stage evaporating apparatus of the present invention is particularly adapted to the purification of sea water, since concentrated sea water presents definite problems. More specifically, in addition to depositing scale, concentrated sea water tends to be a corrosive influence on metals with which it comes in contact and the present invention is, therefore, particularly advantageous in that it tends to minimize these effects.

While the present invention has been described with reference to a particular embodiment thereof, it will be understood that numerous modifications may be made by those skilled in the art without departing from the true spirit and scope of the invention. Therefore, the appended claims are intended to cover all such equivalent variations as come within the true spirit and scope of the invention.

What I claim as new and desire to secure by Letters Patent of the United States is:

1. Evaporating apparatus comprised of a plurality of evaporating stages designed to operate at a plurality of pressures including:
   (a) means to deliver unevaporated liquid from each stage, except the lowest pressure stage, to a lower pressure evaporating stage;
   (b) means to transfer vapor products from each stage, except the lowest pressure stage, to a lower pressure evaporating stage;
   (c) a condenser;
   (d) means to deliver to said condenser a liquid feed, said liquid feed to be heated therein, and vapor products of the lowest pressure stage of the apparatus, said products to be condensed therein;
   (e) a first cooler;
   (f) means to deliver to said first cooler condensate, from a high pressure evaporating stage, said condensate to be cooled therein, and a first portion of the liquid feed, said portion to be heated therein;
   (g) a second cooler;
   (h) means to deliver to said second cooler condensate, from a low pressure evaporating stage, said condensate to be cooled therein, and a second portion of the liquid feed, said portion to be heated therein;

(i) heat exchange means in contact with vapor products of the various stages of the apparatus;
(j) means to deliver a third portion of the liquid feed to said heat exchange means, said portion to be heated therein;
(k) means to deliver the third portion of the liquid feed from said heat exchange means to the highest pressure stage of the apparatus;
(l) means to combine the second portion of the liquid feed with unevaporated liquid prior to its delivery to a lower pressure stage of the apparatus; and
(m) means to combine the first portion of the liquid feed with unevaporated liquid prior to its delivery to an intermediate pressure stage of the apparatus.

2. Evaporating apparatus, a recited in claim 1, wherein said heat exchange means is located within the vapor space of the various stages of the apparatus.

3. Evaporating apparatus, as recited in claim 1, further including means to transfer condensate from each stage, other than the first and last, to a lower pressure stage wherein said condensate is flash evaporated and condensed.

References Cited

UNITED STATES PATENTS 2,908,618  10/1959  Bethon _____ 203—11
2,979,443  4/1961   Frankel _____ 202—173

NORMAN YUDKOFF, *Primary Examiner.*

D. EDWARDS, *Assistant Examiner.*